W. S. MAYO.
Wheel Tire.

No. 86,772.

Patented Feb. 9, 1869.

Witnesses:

Inventor:
Dr. W. S. Mayo
per Munn & Co
Attorneys.

W. S. MAYO, OF NEW YORK, N. Y.

Letters Patent No. 86,772, dated February 9, 1869.

IMPROVEMENT IN CARRIAGE-WHEELS.

The Schedule referred to in these Letters Patent and making part of the same.

*To all whom it may concern:*

Be it known that I, W. S. MAYO, of the city, county, and State of New York, have invented a new and useful Improvement in Carriage-Wheels; and I do hereby declare that the following is a full, clear, and exact description thereof, which will enable others skilled in the art to make and use the same, reference being had to the accompanying drawings, forming part of this specification.

This invention relates to a new and useful device for aiding and facilitating the crossing of railroad-tracks by carriages and other wheeled vehicles; and consists in forming a series of shoulders and inclined planes on the edges or corners of the wheel, by notching or crenating the same, so that the wheel, when brought in contact with the rail at any angle other than a right angle, will take hold of or bite the rail, and thereby allow the wheel to mount and pass over the rail, as will be hereinafter more fully described.

In the accompanying plate of drawings—

Similar letters of reference indicate corresponding parts.

Figure 1:
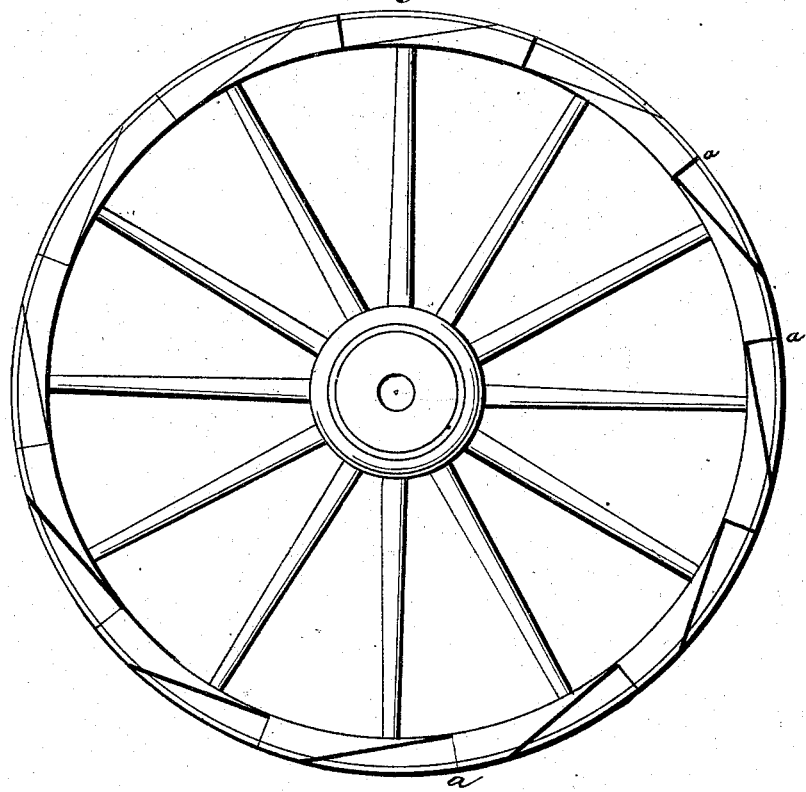
Figure 1 represents a side elevation of a wheel with the rim constructed according to my invention, the crenated surface including both tire and felloe.
Figure 2:
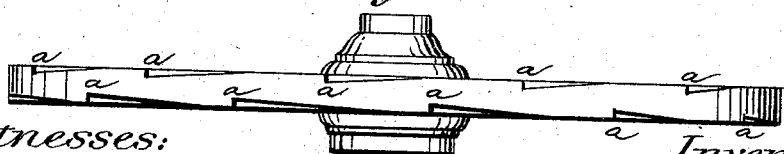
Figure 2 is a top view of the same, showing the shoulders and inclines formed in each edge of the tire.

The difficulty experienced in crossing a railroad-track, at an angle varying much from a right angle, with any description of wheeled vehicles, all are familiar with. No device or contrivance has hitherto been invented to facilitate this difficult and most annoying performance, and prevent the damage constantly being done to all descriptions of wheeled vehicles, especially to light and valuable carriages. To provide a remedy for the difficulties and annoyances thus experienced, is the object which I have in view in the present invention.

For this purpose I form shoulders, more or less in number, around the edges of the carriage-tire, marked $a$ in the drawing.

Between the shoulders $a$ are inclined planes $b$, occupying more or less of the space between the shoulders, which inclined planes will guide the wheel, and serve to bring the shoulders in direct contact with the rail, and give it a bite thereon, by which it will be raised, so as to pass over without sliding or straining the wheel or axle.

I do not confine myself to any particular number, form, or size, as regards the series of shoulders and inclined planes on the tire or rim of the wheel.

The notch or shoulder, and the inclined surface, may be confined entirely to the tire, being formed on its outer corner or angles, with the felloe left intact, or the shoulders and inclines may pass entirely through the tire, with the wood of the felloe cut away, so as to correspond with the inclined surfaces on the tire, as seen in fig. 1.

The advantages of this method of forming the wheels of carriages are many, and must be obvious to all.

I claim as new, and desire to secure by Letters Patent—

The tire or rim of a wheeled vehicle, having shoulders and inclines $a$ $b$, being a series of notches and inclined planes in, or applied as projections to the tire, or in both tire and felloe, substantially as and for the purpose described.

The above specification of my invention signed by me, this 26th day of December, 1868.

W. S. MAYO.

Witnesses:
FRANK BLOCKLEY,
E. G. COLLINS.